Dec. 13, 1955  V. R. FARNSWORTH  2,726,435
BROACHING TOOL

Filed Aug. 23, 1954  2 Sheets-Sheet 1

INVENTOR.
VERL R. FARNSWORTH
BY
Miles Heminger
ATTORNEY

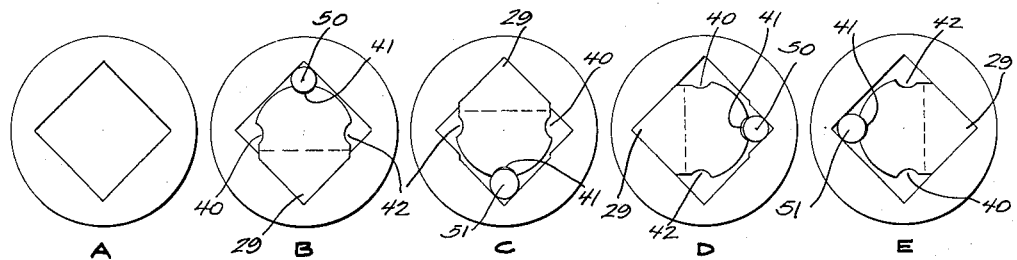
Fig. 9
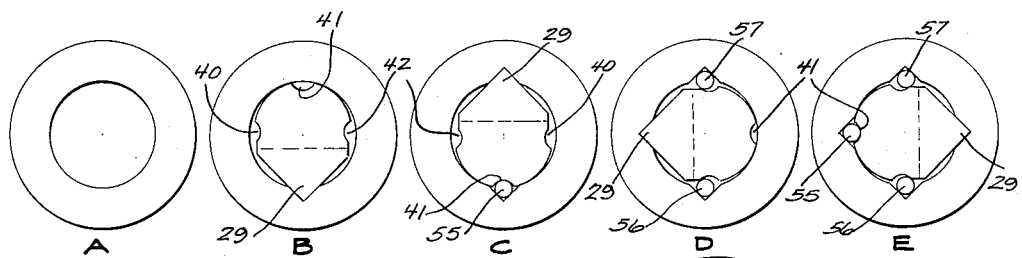
Fig. 11
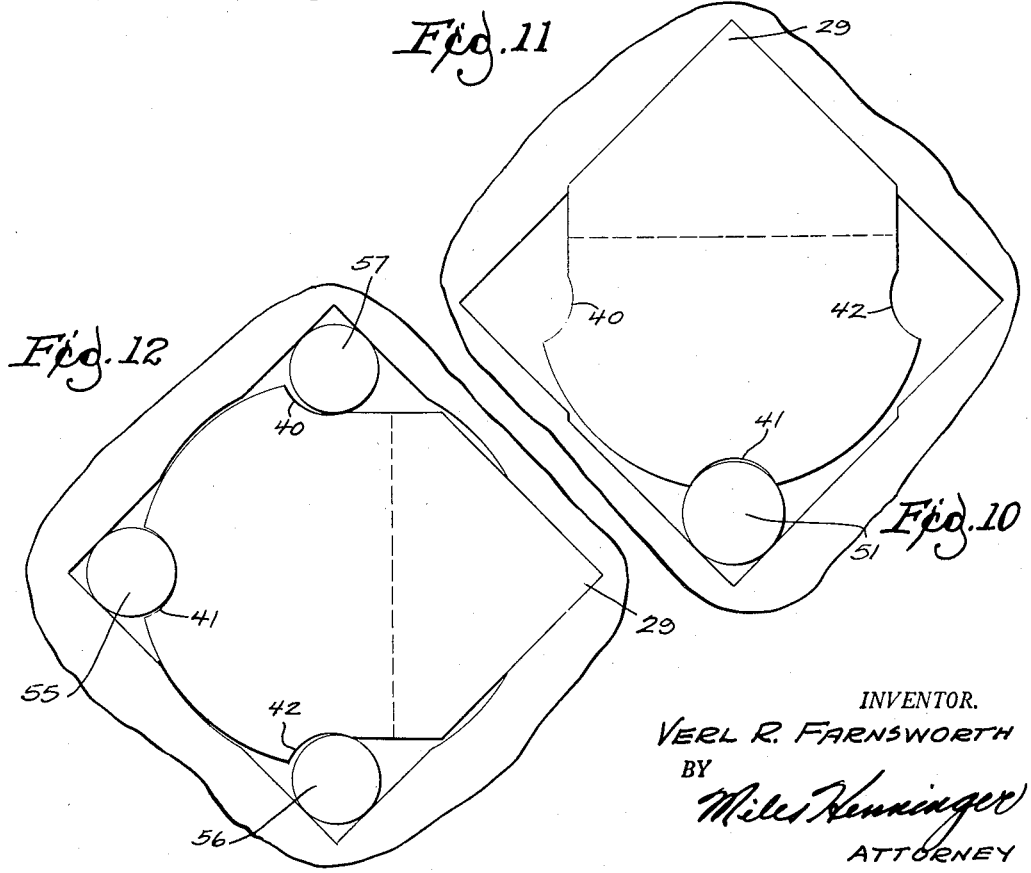
Fig. 12
Fig. 10
INVENTOR.
VERL R. FARNSWORTH
BY
Miles Henninger
ATTORNEY

United States Patent Office 2,726,435
Patented Dec. 13, 1955

1

2,726,435

BROACHING TOOL

Verl R. Farnsworth, Milwaukee, Wis.

Application August 23, 1954, Serial No. 451,550

10 Claims. (Cl. 29—95.1)

This invention relates to improvements in a tool for broaching internal surfaces of a workpiece and particularly to a broach for converting cylindrical holes to non-cylindrical shape.

Machine parts frequently require holes which are square, polygonal, have a notch or slot cut outwardly from the original cylindrical hole, or otherwise differ from the cylindrical form resulting from the usual boring or drilling operation and which are formed by broaching. Whatever the deviation from cylindrical form, it is necessary that the broached portion or portions of the hole be in given relation to the original axis of the hole, that such broached portions be oriented as desired to another portion of the machine and that the broached portions be in given relation to one another. When the hole is to have symmetrical opposite broached portions or is to be broached to square, or polygonal form, it is desirable that the broach be provided with means positively indexing the broach to exactly the successive positions required for keeping all of the broached portions in proper relation to one another and for guiding the broach to keep the cut in the indexed position.

It is therefore one object of the present invention to provide a broaching tool for use on internal surfaces of a workpiece and having guiding means coacting with a first broach cut and succeeding cuts in the workpiece, for indexing succeeding cuts in a given relation to the first cut.

Another object of the invention is to provide an internal broaching tool with guides coacting with preceding broach cuts in the workpiece whereby the tool is increasingly positively indexed to given positions for all cuts following the first cut.

Another object of the invention is to provide an internal broaching tool with separate indexing members which are interchangeable within a given range of sizes (undersize to oversize) for producing cuts in a workpiece within the range of indexing member sizes without change in the cutting portion of the tool or the manner of its operation.

Other objects and advantages will be apparent from the accompanying drawings and the following description:

In the drawings:

Fig. 9 is a diagram in which parts A through E show the position of the tool in the various steps required to make an "over size" square hole.

Fig. 10 is an enlarged view of the step shown in Fig. 9C.

Fig. 11 is a diagram in which the parts A through E show the position of the tool in the work-piece in the various steps required to make an "under size" square hole; and Fig. 12 is an enlargement of the step shown in Fig. 11E.

Figure 1:
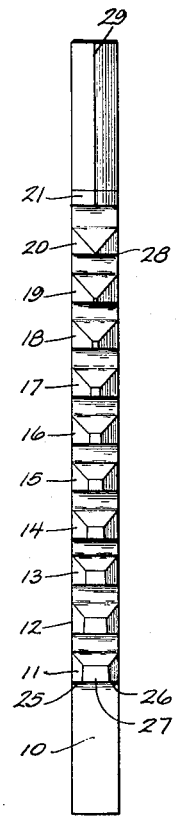
Fig. 1 is a view looking down on the cutting teeth of the present broach.
Figure 2:
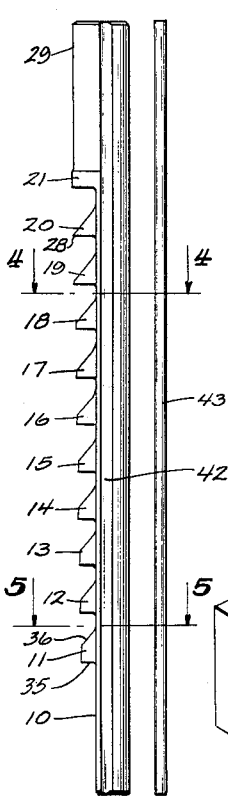
Fig. 2 is a view looking at the side of the broach rotated 90° from the position shown in Fig. 1.
Figure 3:
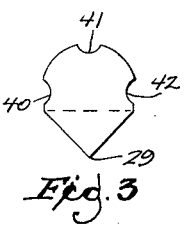
Fig. 3 is a view of the end of the broach for finishing a cut.
Figure 4:
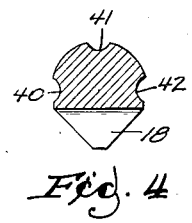
Fig. 4 is a cross-section taken on the plane 4—4 of Fig. 2.
Figure 5:
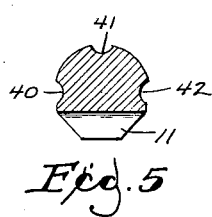
Fig. 5 is a cross-section taken on the plane 5—5 of Fig. 2.

Referring generally to the drawings, the present broach is the form adapted for forming a square hole and is a bar of substantially cylindrical shape but with portions of the longitudinal surface defined by two perpendicular planes intersecting at a line of common origin and extending tangent to the circular portion of the bar and slightly beyond the line of tangency. The bar has three longitudinal flutes or grooves in its circular surface portion, spaced 90° from the adjacent flutes. Two of the flutes are at the ends of a diameter of the bar and one edge of each of such flutes is extended to provide narrow flat surfaces at the roots of the teeth respectively making a 135° angle by their intersection with the perpendicular planes to provide an overlap for that portion of the cutting edges. Beginning at edges of the longitudinally flat surfaces, approximately one-half of the bar cross-sectional area is defined by the two perpendicularly intersecting flat plane surfaces to provide side surfaces of generally pyramidal teeth and of a finish cutting end which is generally triangular in section. The teeth are of different heights and widths at the top edge, varying at a constant rate from a first tooth of least height and widest top edge to the last tooth where the top edge approaches a point while the finishing end of the broach approaches a line top edge. The front surfaces of the teeth are slightly undercut to the proper cutting angle dependent on the material being cut, while the back surfaces of the teeth slope rearwardly at a sufficient angle to furnish adequate mass for supporting the cutting edges of the teeth. The flutes are of a size to seat hardened steel indexing and guide wires of exact and uniform size. The size of the guide wires is varied dependent on whether a cylindrical hole of a given diameter is to be made square, etc. with the same dimensions as the diameter of the original hole or whether the hole is to be oversize or undersize relative to the diameter of the original hole.

Referring to the drawings by numbered parts, reference numeral 10 designates a flat surface at the entering or starting end of the broach at which end the broach is cut down to approximately the roots of the teeth. The teeth cutting edges are defined by the 90° intersecting planes and the 135° intersecting planes defining a portion of the peripheral surface of the bar and a plane at an angle to the bar centerline whereby the teeth vary in height from the first tooth to the final or finish end cutter. Hence the teeth are generally pyramidal but vary in shape from the first tooth 11 to the finish cutter 21. Each tooth has two side cutting edges 25, 26 and a top cutting edge 27, the length of the several side and top cutting edges varying as the height of the teeth varies. The side cutting edges 25, 26 of all of the teeth and of the finish end cutter are in the same planes so that each following side edge cuts the side surfaces to only the extent of its greater height as compared to the preceding tooth. The top width of the teeth 11 through 19 are successively less from the first tooth, the last tooth 20 and the finish cutter 21 being substantially a point 28 and a line 29 respectively and therefore having no appreciable top surfaces.

The fronts or breast surfaces 35 of the teeth and the finish cutter are cut backward to provide the proper cutting angle for the material, the clearance being substantially the same in each instance as the depth of the several cuts by each tooth and by the finish cutter are substantially the same. The rear surfaces 36 of the teeth are at an acute angle to provide sufficient mass and strength in all necessary directions in the teeth for adequate support of the several individual cutting edges.

The circular peripheral portion of the broach bar is provided with a number of flutes or grooves, the number of such grooves being determined by the number of internal cuts which are to be made by a particular broach. The present disclosure is of a broaching tool for cutting square holes and three flutes 40, 41, 42 are accordingly shown, which extend longitudinally of the bar from end to end and with the several flutes at spacing of 90° from the nearest adjacent flutes. The flutes 40, 42 are at ends of a diameter of the cylindrical bar portion and the flute 41 is at one end of the bar diameter having the edge 29 of the finished cutter 21 at the other end thereof. The flutes are of uniform cross-sectional size, have a partially cylindrical surface and are all the same size. The flutes are adapted for severally seating guide wires or rods 43, 44, 45 of hardened and well straightened steel of uniform cross-section and are cylindrical in cross-section, except when the holes are to have more than four sides and hence require prismatic shaped guides.

When the holes to be broached are to be "on size," i. e. of the size of the original diameter of the drilled hole, the bar and guide wires are the same size for all guides and are of a size, whereby the guides will fit closely into the flutes and seat firmly in the angle formed by the broach cut. If over-sized square holes are to be made, two different sizes of guides are used, one guide being oversize by the given amount and the other guide being oversized by twice the given amount. If undersize square holes are to be made, the starting hole is drilled slightly over-size and the guide wires are slightly undersize in diameter by two different amounts.

Figure 6:
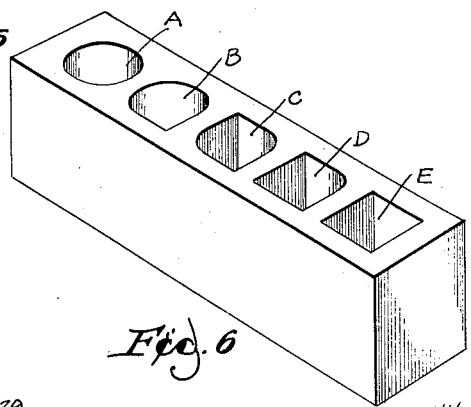
Fig. 6 is a perspective view of a workpiece illustrating the different stages A—E in forming a square hole therein.
Figure 7:
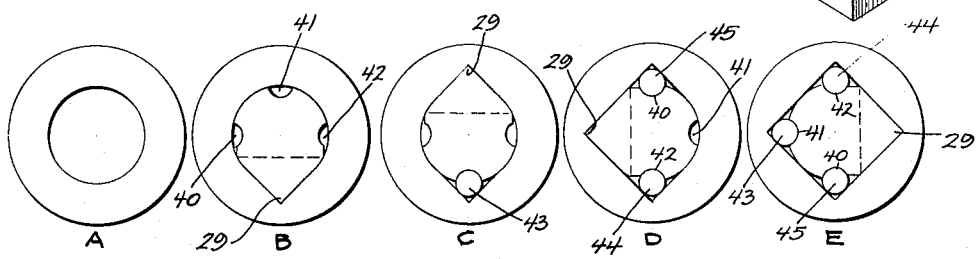
Fig. 7 is a diagram in which parts A—E show the position of the tool in the various steps shown in Fig. 6.

The method for using the present broach can be seen by reference to Figs. 6 and 7 in which A shows a cylindrical beginning or starting hole drilled or reamed to the diameter of the cylindrical portion of the broach. The outline of one corner of the desired square is marked on the end of the workpiece in the exact desired relation or position relative to some other portion of the machine, as the position of such corner determines the orientation of the hole in the workpiece. The broach starting end 10 is then entered into the hole and the teeth are aligned with the previously marked outline of the corner to be broached. The broach is then pressed through the workpiece to produce the result shown at B in Fig. 6. It will be noted that no guide wires are used for this first cut as is shown at B in 7.

For the next corner, the broach is started in the hole with guide 43 in flute 41 and with such guide bearing on the surfaces of the first cut made as shown in Fig. 7C. Upon pressing the broach through the workpiece the form of hole shown at C in Fig. 6 is attained. For the third cut, the broach is started in the hole with the flutes 40, 42 opposite the first and second cuts and guides 44, 45 bearing on the surfaces of such cuts as at D in Fig. 7. Pressing a broach through the workpiece then results in the hole shown at D in Fig. 6. For the last cut, guides are used in all three of the flutes and bear on the surfaces of each of the three preceding cuts as shown at E in Fig. 7 and the result is the square hole at E in Fig. 6.

When an "oversize" square hole is to be made, i. e. a hole having a side dimension at the end thereof greater than the diameter of the given cylindrical starting hole from which the shaping is begun, the hole is first drilled to the given diameter and then broached to the standard size as described above and as shown in Fig. 9A. Broaching to oversize is then done as a separate series of operations as shown in Figs. 9 and 10. For the first cut, a guide wire 50 is placed in the flute opposite the location for the first cut and no other guides are used, the guide 50 used being larger in diameter by approximately the oversize dimension desired as compared to the guides normally used for the given diameter. For the second cut, the broach is rotated 180° and a guide 51 twice the desired oversize dimensions is now placed in the corner made by the first cut. The third and fourth cuts are then made in the same manner as the first two cuts. Oversize holes therefore require guide wires of sizes differing from the guide wires used when a hole is to be made of a side dimension equal to the diameter of the drilled starting hole.

Figure 8:
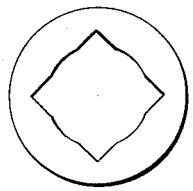
Fig. 8 is an end view of a workpiece showing an "undersize" square hole therein.

When a square hole is to be made "under size," the starting hole is first drilled to a diameter slightly more than the side dimension required for a standard size square hole. The first cut is made at the desired location without the use of any guide wires. For the second cut, the broach is turned 180° to cut the corner opposite the first cut and a guide wire 55 is used in the first cut which is a diameter smaller by approximately two times the amount of undersize desired for each surface (or equal to the total decrease in size desired for the two flat surfaces on a side as shown in Fig. 8). For the third cut, guides 56 and 57 are used in the first and second cuts which are undersized by the amount of reduction desired in any one of the "flats" on one side of the hole as compared to the radius of the standard size drilled starting hole. For the fourth cut, all three guide wires 55, 56 and 57 are used, the guide 55 being placed in the flute opposite the top tooth edges 27, 28 and 29 while the guides 56 and 57 are placed in the other two flutes. Undersize holes therefore require the use of two different sizes of guides 55 and 56, 57, each differing from the diameter of the guides which would be used in square holes of side dimensions equal to the diameter of the drilled starting hole. It will be understood that the undersize hole has a portion on each side wall defined by an arc as shown in Figs. 8 and 12, such arcs being the residues of the cylindrical hole surface formed by drilling the starting hole.

It will thus be seen that the present broach is positively indexed for all cuts following the first cut, that the indexing of all cuts following the first cut is equally positive regardless of which cut is being made. The surfaces of the broach are supported in part by the wall of the hole while making the second and third cut and are thereafter supported by a sufficient number of guide wires to keep the broach in its proper position relative to the first cut. It will be obvious that change in the shape of the teeth and in the number of flutes makes it possible to broach a hole with any number of sides from a square with only four sides to a polygon approaching a circle provided the angle between each two broached surfaces is such as to support a similarly shaped index and guide wire.

The number of flutes may be increased to provide at least two flutes substantially opposite a cut so that any cut after the first is indexed by two guides. Naturally, it is best to use as many guide wires as there are flutes opposite to or reacting to the force in making the cuts to secure the most positive indexing of the cuts. The number of flutes and guide wires should not however be increased to the point where a question arises as to the sufficiency of material between flutes to withstand the pressures involved and provided the size of the guide wires is not reduced to the point where it becomes difficult to keep such wires straight. The present tool is especially useful where diametrically opposite cuts are to be made from the inside of a hole as when the hub of the wheel is to be attached to a shaft by splines or their equivalent rather than by a single large key.

Although but one embodiment of the present invention has been illustrated and described, it will be apparent to those skilled in the art that various changes and modifications may be made therein without departing from the spirit of the invention or from the scope of the appended claims.

I claim:

1. In a tool for broaching localized enlargements in a circular hole of given diameter, a bar with cutting teeth transversely of the bar, the bar having a plurality of flutes longitudinally thereof and in spaced relation peripherally of the bar, and separate guide members seating in the flutes and extending above the peripheral surface of the bar.

2. In a broaching tool for shaping internal surfaces in a workpiece, a bar of substantially cylindrical shape with cutting teeth transversely of the bar and occupying a portion of the bar length, the side cutting edges of the teeth being defined by intersecting planes longitudinally of and tangent to the cylindrical bar surface, the bar having a plurality of flutes from end to end of the bar and spaced about the cylindrical portion of the bar periphery, and separate guide members seating in the flutes and extending above the peripheral surface of the bar.

3. In a broaching tool for shaping internal surfaces in a workpiece, a bar having cutting teeth extending transversely of the bar from a portion of the periphery of the bar and having a partially cylindrical surface, the teeth in the bar having side cutting edges defined by intersecting planes longitudinally of and tangential to the cylindrical bar surface and having top cutting edges of increasing height and decreasing width from the starting end to the finish end of the bar, the bar having a plurality of flutes longitudinally thereof and of uniform size and spaced peripherally about the bar cylindrical surface, and separate guide members of uniform cross-sectional dimension seating in the flutes and extending above the peripheral surface of the bar.

4. A broaching tool for localized enlargement of a circular hole of given diameter and comprising a bar with cutting teeth transversely of the bar and occupying a portion of the peripheral surface thereof, the bar having a plurality of flutes longitudinally thereof and extending from end to end of the bar and in the untoothed portion of the bar, and separate guide members severally seating in and of a size to be partially enclosed in the flutes, the guide members extending substantially the length of the flutes.

5. A broaching tool for localized enlargement of a circular hole of given diameter and comprising a bar with cutting teeth transversely thereof and occupying a portion of the peripheral portion of the bar, the bar having a plurality of flutes longitudinally thereof and in spaced relation to one another peripherally of the bar and of cylindrical surface contour, and separate cylindrical wires seating in the flutes and extending above the peripheral surface of the bar.

6. In a broaching tool for localized enlargement of a circular hole of given diameter, a bar with cutting teeth transversely of the bar and having a plurality of flutes parallel with the longitudinal axis of the teeth, the flutes being equally spaced about a portion of the bar periphery and being semi-cylindrical in contour, and separate cylindrical wires seating in the grooves and extending above the bar peripheral surface.

7. In a broaching tool for localized enlargement of a circular hole of given diameter, a bar with generally pyramidal cutting teeth transversely thereof and occupying a non-cylindrical portion of the bar surface, the teeth having side cutting edges and having top cutting edges of increasing height and decreasing width from the starting end to the finish end of the bar, the bar having a plurality of flutes from end to end thereof, the flutes being spaced 90° from one another about the cylindrical portion of the bar periphery and being semi-cylindrical in shape, and separate cylindrical wires fitting into the flutes and extending above the bar peripheral surface for indexing the bar teeth to given position for all cuts following the first cut.

8. A broaching tool for shaping a circular hole of given diameter to substantially rectangular shape and comprising a bar with cutting teeth transversely thereof and occupying a portion of the length thereof, the bar having a plurality of semi-cylindrical flutes longitudinally thereof from end to end of the bar in the untoothed portion of the bar, and separate cylindrical guide members severally seating in the flutes for at least partial enclosure thereby, the diameter of the guide members differing depending on the difference in finished side dimension of the hole desired as compared to the diameter of the drilled starting hole.

9. A broaching tool for shaping a circular hole of given diameter to substantially rectangular shape and comprising a bar with cutting teeth transversely thereof and occupying a portion of the length thereof, the bar having a plurality of semi-cylindrical flutes longitudinally thereof from end to end of the bar in the untoothed portion of the bar, and separate cylindrical guide members severally seating in the flutes for at least partial enclosure thereby, the diameter of the guide member being larger by the increase in finished side dimension of the hole cut from the circular hole of a given diameter whereby an oversize final side dimension is obtained as compared to the diameter of the drilled starting hole.

10. A broaching tool for shaping a circular hole of given diameter to substantially rectangular shape and comprising a bar with cutting teeth transversely thereof and occupying a portion of the length thereof, the bar having a plurality of semi-cylindrical flutes longitudinally thereof from end to end of the bar in the untoothed portion of the bar, and separate cylindrical guide members severally seating in the flutes and at least partially enclosed thereby, the diameter of the guides being severally smaller by two times the decrease and by the same amount as the desired decrease in final side dimension of the hole whereby an undersize final side dimension of the hole is obtained as compared to the diameter of the drilled starting hole.

References Cited in the file of this patent

UNITED STATES PATENTS

| | | |
|---|---|---|
| 2,510,835 | Rice | June 6, 1950 |
| 2,661,663 | Brinkman | Dec. 8, 1953 |